(12) United States Patent     (10) Patent No.:   US 12,583,592 B2

Ijadi-Maghsoodi     (45) Date of Patent:    Mar. 24, 2026

(54) COMPACT AIRCRAFT RESCUE HOIST WITH HIGH WRAP ANGLE

(71) Applicant: Hornet AcquisitionCo, LLC, Vancouver, WA (US)

(72) Inventor: Bejan Ijadi-Maghsoodi, San Dimas, CA (US)

(73) Assignee: HORNET ACQUISITIONCO, LLC, Vancouver, WA (US)

( * ) Notice: Subject to any disclaimer, the term of this patent is extended or adjusted under 35 U.S.C. 154(b) by 0 days.

(21) Appl. No.: 19/060,147

(22) Filed: Feb. 21, 2025

(65) Prior Publication Data

US 2025/0269970 A1     Aug. 28, 2025

Related U.S. Application Data

(60) Provisional application No. 63/559,051, filed on Feb. 28, 2024.

(51) Int. Cl.
    *B64D 25/02*       (2006.01)
    *A61G 3/00*       (2006.01)

(52) U.S. Cl.
    CPC ............... *B64D 25/02* (2013.01); *A61G 3/00* (2013.01)

(58) Field of Classification Search
    CPC .......... A61G 3/00; B64C 39/022; B64D 1/00; B64D 1/02; B64D 1/08; B64D 1/12; B64D 1/22; B64D 3/00; B64D 3/02; B64D 9/00; B64D 9/003; B64D 25/02; B64D 2009/006; B64U 2201/202; B65H 59/38; B65H 59/382; B65H 59/385; B65H 59/388; B66D 1/36; B66D 3/22; B66D 3/26; B66D 2700/0183; B66D 2700/0191; B66D 2700/025
    USPC ....................................................... 244/138 R
    See application file for complete search history.

(56) References Cited

U.S. PATENT DOCUMENTS

| | | | | |
|---|---|---|---|---|
| 3,358,968 | A | * 12/1967 | Walsh ...................... | B64D 1/22 254/299 |
| 3,804,371 | A | * 4/1974 | Mills ........................ | B64D 1/22 254/336 |
| 3,809,334 | A | * 5/1974 | Beurer ..................... | B64D 1/22 242/390.8 |
| 4,015,798 | A | * 4/1977 | Benya ...................... | B66D 1/38 242/482.6 |
| 4,294,429 | A | 10/1981 | Desplats | |
| 5,957,433 | A | 9/1999 | Fujikawa et al. | |
| 10,556,779 | B2 | * 2/2020 | Friederichs .............. | B66D 1/38 |
| 10,723,602 | B2 | * 7/2020 | Maghsoodi .............. | B66D 1/28 |

(Continued)

OTHER PUBLICATIONS

ISA; International Search Report and Written Opinion dated Apr. 11, 2025 in PCT/US2025/017668.

*Primary Examiner* — Joshua E Rodden

(74) *Attorney, Agent, or Firm* — SNELL & WILMER L.L.P.

(57) ABSTRACT

A rescue hoist includes a housing mountable to an airframe, a cable drum rotatably mounted in the housing, a traction sheave rotatably mounted in the housing positioned to one side of the cable drum, a cable, and a hook mounted to one end of the cable. The cable is wrapped around the cable drum in a first direction, over the traction sheave in a second direction opposite the first direction, and exits the housing under the traction sheave. The housing is compact and configured to be mounted to an aircraft under-wing.

19 Claims, 6 Drawing Sheets

(56) References Cited

U.S. PATENT DOCUMENTS

| | | | |
|---|---|---|---|
| 11,713,118 B1 * | 8/2023 | Whitaker | B64C 39/022 |
| | | | 244/110 R |
| 2013/0181177 A1 * | 7/2013 | Moll | B66D 1/30 |
| | | | 254/338 |
| 2018/0339891 A1 | 11/2018 | Ijadi-Maghsoodi et al. | |
| 2024/0002199 A1 | 1/2024 | Welschof et al. | |

* cited by examiner

COMPACT AIRCRAFT RESCUE HOIST WITH HIGH WRAP ANGLE

CROSS-REFERENCE TO RELATED APPLICATIONS

This application is a non-provisional of, and claims priority to, and the benefit of U.S. Provisional Application No. 63/559,051, filed on Feb. 28, 2024, and entitled "COMPACT AIRCRAFT RESCUE HOIST WITH HIGH WRAP ANGLE," which is hereby incorporated by reference in its entirety for all purposes.

FIELD

The present disclosure relates generally to a rescue hoist, and more particularly, to a compact rescue hoist for under-wing mounting to an aircraft.

BACKGROUND

Rescue hoists for aircraft and the like generally mount alongside an opening into the aircraft and operate to deploy and retrieve a length of cable for hoisting persons and objects. Traditional rescue hoists include a motor-driven cable drum configured to be rotated in opposite directions to wind and unwind the length of cable. One end of the cable is fixed to the cable drum, and the other end of the cable terminates with a hook. In traditional rescue hoist configurations, the cable exits the cable reel in a downward direction to minimize cable direction changes that may result in cable fouling. This configuration positions the hook and any intermediate winding mechanism directly below the cable drum, thereby resulting in a rescue hoist having a tall profile that may be practically and aerodynamically undesirable in certain applications.

Therefore, what is needed is a rescue hoist having a comparatively shallow profile, and which can accommodate a cable direction change without fouling.

SUMMARY

According to one aspect, the inventive concepts according to the present disclosure are directed to a rescue hoist including a housing mountable to an airframe, a cable drum rotatably mounted in the housing, a traction sheave rotatably mounted in the housing and positioned to one side of the cable drum, a cable wrapped around the cable drum in a first direction, over the traction sheave in a second direction opposite the first direction, and exiting the housing under the traction sheave, and a hook mounted to one end of the cable and positioned outside of the housing and under the traction sheave.

In some embodiments, a rotational axis of the traction sheave is positioned higher in the housing than a rotational axis of the cable drum.

In some embodiments, the cable is maintained in contact with about half of the circumference of the traction sheave.

In some embodiments, the rescue hoist further includes at least one pinch roller rotatably mounted in the housing and configured to press the cable against the traction sheave.

In some embodiments, each of the traction sheave and the at least one pinch roller defines a circumscribing cable groove in a plane transverse to its rotational axis.

In some embodiments, the cable drum and the traction sheave are coupled for synchronous rotation.

In some embodiments, the housing has a top, a bottom, opposing ends, and opposing lateral sides, the traction sheave is positioned between the cable drum and one of the opposing lateral sides, and a length of the housing is greater than a height of the housing.

In some embodiments, the housing includes a medial extension provided on one of the lateral sides of the housing, wherein the traction sheave is disposed, at least partly, in the medial extension, and wherein the cable exits the housing through an opening formed in a bottom of the medial extension.

In some embodiments, the housing includes mounting hardware positioned on the top of the housing for mounting the housing to the airframe.

In some embodiments, the housing is configured to mount under a wing of a rotorcraft.

According to another aspect, the inventive concepts according to the present disclosure are directed to a rescue hoist including a compact housing defining a main portion and a lateral portion, a cable drum rotatably mounted in the main portion, a traction sheave rotatably mounted in the lateral portion, a cable wrapped around the cable drum, over the traction sheave, and exiting the housing through an opening formed in the bottom of the lateral portion, and a hook mounted to one end of the cable, the hook positioned outside of the housing and under the lateral portion.

This summary is provided solely as an introduction to subject matter that is fully described in the following detailed description and drawing figures. This summary should not be considered to describe essential features nor be used to determine the scope of the claims. Moreover, it is to be understood that both the foregoing summary and the following detailed description are explanatory only and are not necessarily restrictive of the subject matter claimed.

BRIEF DESCRIPTION OF THE DRAWINGS

Implementations of the inventive concepts disclosed herein may be better understood when consideration is given to the following detailed description thereof. Such description refers to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
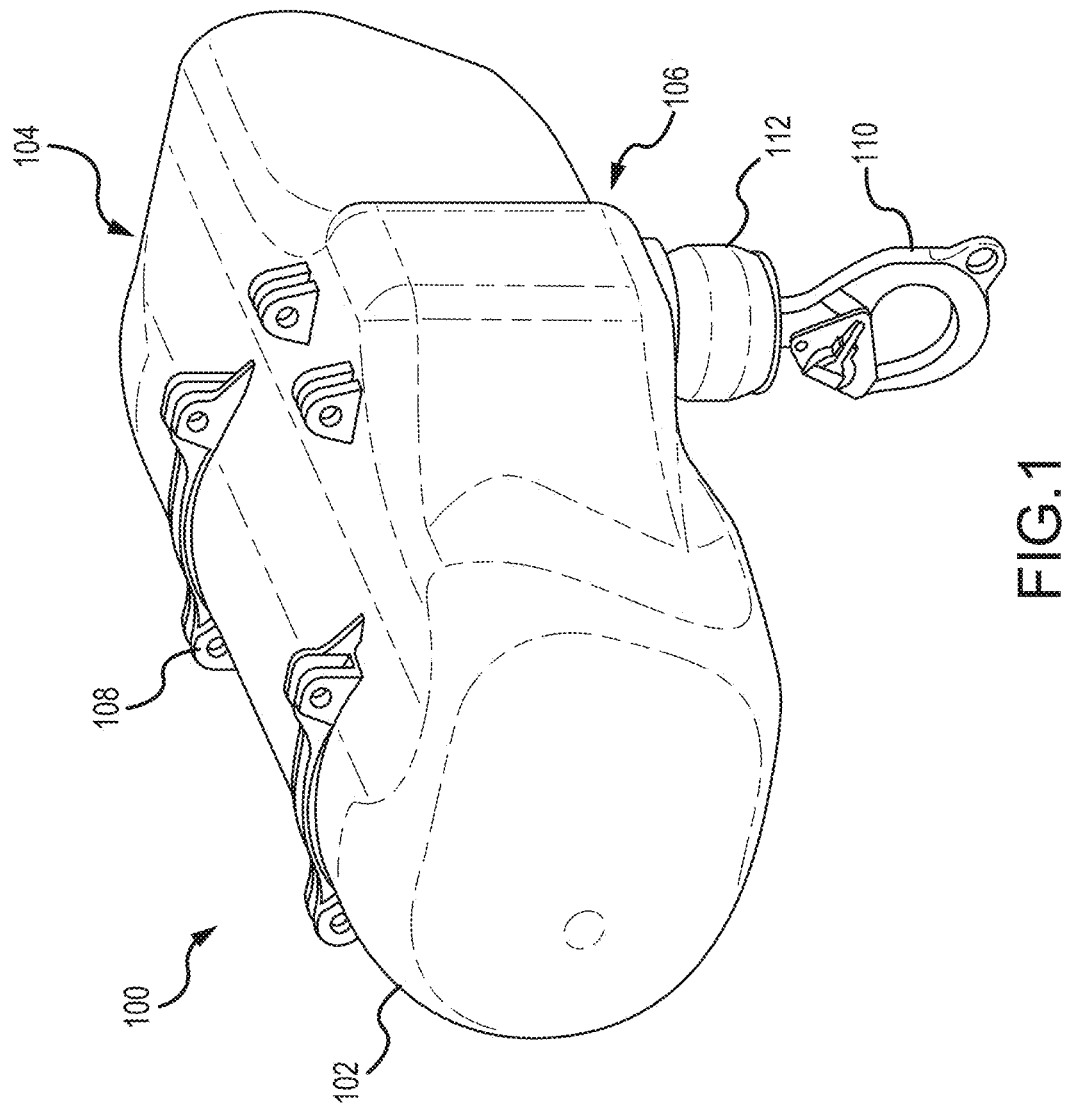
FIG. 1 is an isometric view of a rescue hoist, in accordance with example embodiments of this disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein, a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a compact, "side-mounted", rescue hoist for aircraft such as helicopters, rotorcraft, and the like. The rescue hoist has a shallow profile as compared to traditional rescue hoists in which a cable unwinds from the cable drum in a downward direction. The rescue hoist may be mounted under-wing and outside of an opening into the aircraft. In use, a length of cable is wound on a cable drum and wrapped over a traction sheave configured to maintain a back tension on the cable to prevent cable fouling when the unloaded cable is wound on the cable drum.

FIG. 1 is an isometric view of a rescue hoist 100 according to the present disclosure. The rescue hoist 100 includes a housing 102 configured to be mounted to an airframe, for instance under-wing mounted to an aircraft. The housing 102 generally includes a main portion 104 and a lateral portion 106. The main portion 104 generally includes a top, a bottom, opposing ends, and opposing lateral sides. The lateral portion 106 extends outward from one of the lateral sides. In embodiments, the main portion 104 and the lateral portion 106 are integrally formed to provide a continuous interior space. In embodiments, the housing 102 has a bulbous shape for aerodynamic and safety reasons, and which is generally contoured to the shape of the cable drum and traction subassembly contained therein. Mounting hardware 108, for instance integrally formed with the housing 102, is provided generally along the top of the housing 102 for receiving traditional fasteners for mounting the rescue hoist 100 to the airframe.

In some embodiments, the lateral portion 106 is a medial portion that extends laterally outward a predefined distance from one of the lateral sides of the housing 102. A cable (not shown) exits the housing 102 through an opening formed in a bottom of the lateral portion 106. A hook 110 and a bumper 112, mounted to the end of the cable outside of the housing 102, is positioned directly below the lateral portion 106. In this configuration, the hook 110 and bumper 112, when the cable is wound tight, are pulled tight against the bottom of the lateral portion 106 and are positioned to one side of the main portion 104. In some embodiments, the height of the lateral portion 106 is less than the height of the main portion 104 such that at least the bumper 112 is positioned at least partly alongside the main portion 104. This packaging arrangement reduces the overall profile of the rescue hoist 100.

Figure 2:
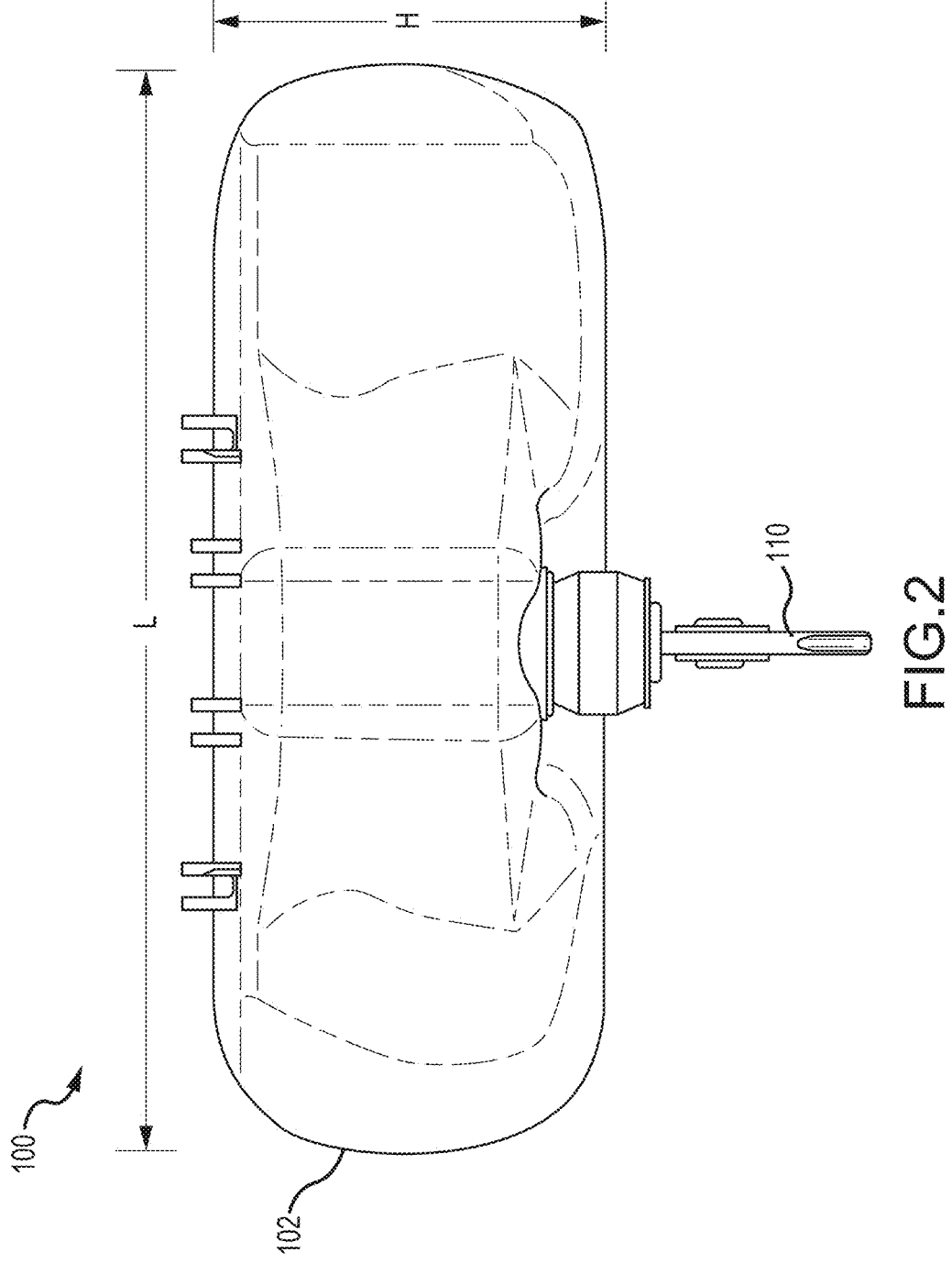
FIG. 2 is a front elevation view of the rescue hoist, in accordance with example embodiments of this disclosure.

FIG. 2 is a front elevation view of the rescue hoist 100, for instance as would be visible to a user in the aircraft. For convenience, the hook 110 is presented at the nearest point to the user whereas the main portion 104 containing the majority of the internal components is positioned farthest from the user. The main portion 104 has a length dimension L (i.e., measured from end-to-end), and a height or thickness dimension H (i.e., measured from top-to-bottom), wherein the length dimension is greater than the height dimension. In some embodiments, even including the hook 110, the length dimension is greater than the height dimension.

Figure 3:
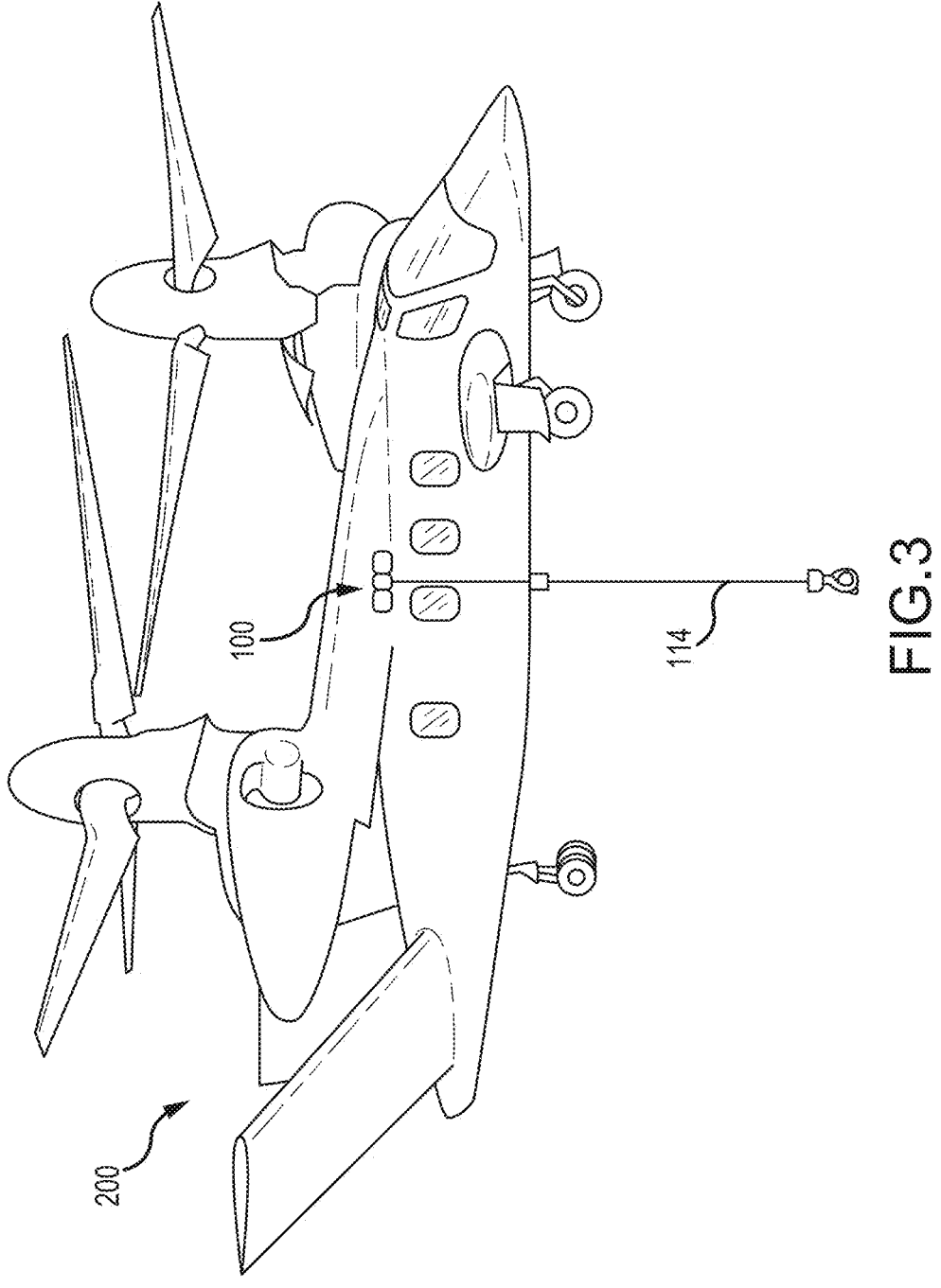
FIG. 3 illustrates a particular aircraft type showing the rescue hoist mounted under-wing, in accordance with example embodiments of this disclosure.

FIG. 3 depicts a non-limiting example of a tilt-wing rotorcraft 200 with the rescue hoist 100 mounted under-wing, and a with a length of cable 114 shown deployed and unloaded. In embodiments, one or more of rescue hoist 100 may be mounted on one or more sides of the tilt-wing rotorcraft 200 depending on the door configuration.

Figure 4:
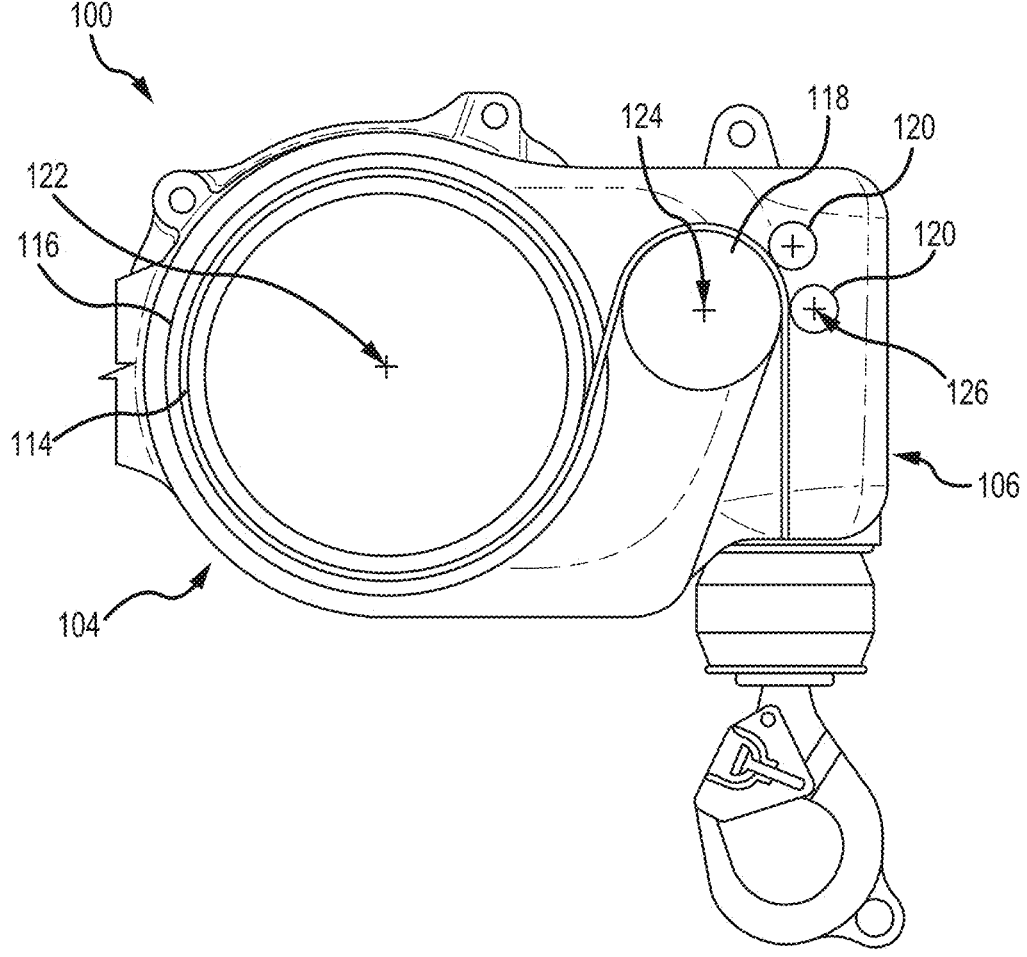
FIG. 4 is a lateral cross-sectional view through the rescue hoist showing the positional relationship of the cable drum and traction sheave, and high wrap routing of the cable, in accordance with example embodiments of this disclosure.

FIG. 4 schematically depicts internal components of the rescue hoist 100. Internal components may include, but are not limited to, a cable drum 116 as part of a cable drum assembly, and a traction subassembly including a traction sheave 118 and at least one pinch roller 120. Each of the cable drum 116, the traction sheave 118, and the at least one pinch roller 120 is rotatably mounted in the housing 102. In some embodiments, at least the cable drum 116 may also be translatably mounted in the housing 102. Each of the cable drum 116, the traction sheave 118, and the at least one pinch roller 120 rotates about a substantially horizontal rotational axis. As such, the cable drum 116 defines a cable drum rotational axis 122, the traction sheave 118 defines a traction sheave rotational axis 124, and the at least one pinch roller 120 defines a pinch roller rotational axis 126. In embodiments, considering the cable routing discussed in detail below, the traction sheave rotational axis 124 may be mounted higher in the housing 102 than the cable drum rotational axis 122, and the pinch roller rotational axis 126 may be mounted at the same height or higher than the traction sheave rotational axis 124, depending on a particular one of the at least one pinch roller 120.

The traction sheave 118 is positioned to one side of the cable drum 116, for instance positioned between the cable drum 116 and the lateral side proximal to the lateral portion 106. For space efficiency, at least part of the traction sheave 118 and at least one of the at least one pinch roller 120 may be mounted in the lateral portion 106.

The cable 114 (i.e., cable) is routed such that the cable 114 is wound on the cable drum 116 in a first direction (e.g., clockwise drum rotation to wind the cable 114), exits the cable drum 116 in an upward direction, wraps over the top of the traction sheave 118 in a second direction opposite the first direction (i.e., counterclockwise rotation as the cable 114 is wound), and exits the housing 102 in a downward, substantially vertical direction. In this configuration, the cable 114 changes direction within the housing 102 and forms a 'high' loop over the top of the traction sheave 118, and consequently a relatively large amount of surface area contact is provided between the cable 114 and the outer circumference of the traction sheave 118 (e.g., about half of the circumference or about 180 degrees). This contact provides a large amount of back tension on the cable 114 during winding and unwinding of the cable 114 to prevent fouling.

Figure 5:
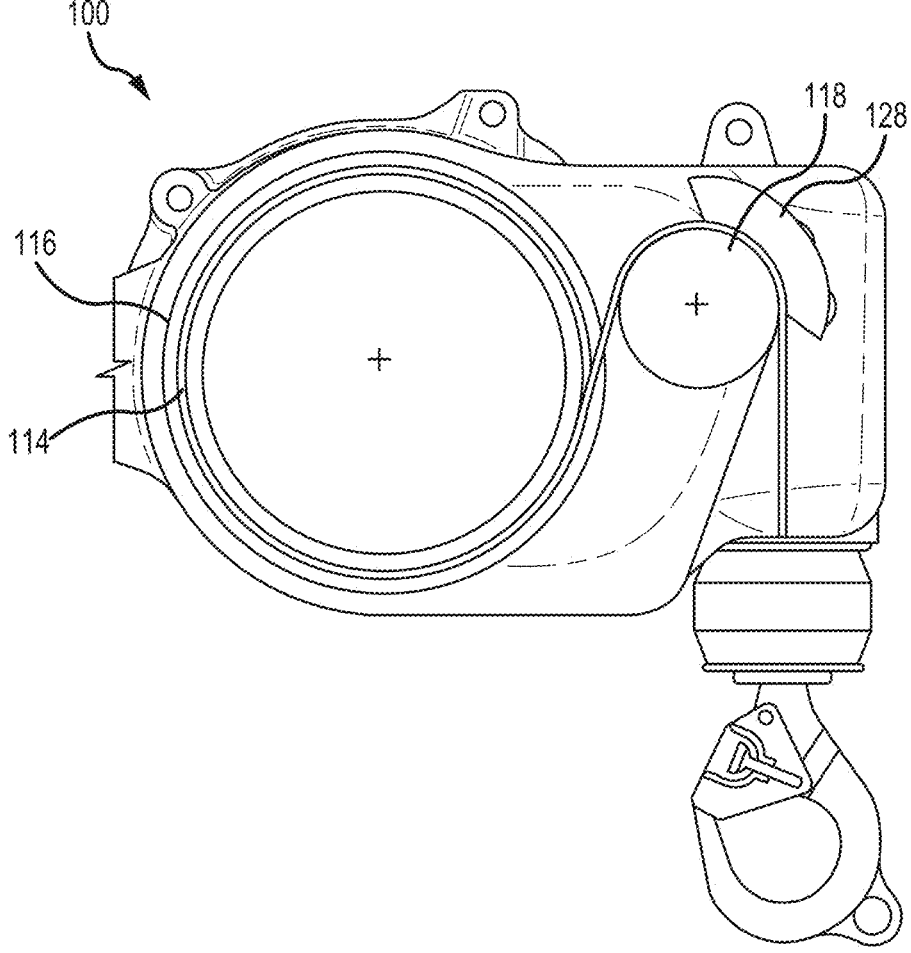
FIG. 5 is a lateral cross-sectional view through the rescue hoist showing a cable guide associated with the traction sheave, in accordance with example embodiments of this disclosure.

FIG. 5 depicts an alternate configuration of a component for pressing the cable 114 in a direction of the traction sheave 118. As shown, the component may be implemented as an elongated arcuate guide 128 that corresponds to a portion of the outer circumference of the traction sheave 118. In embodiments, the elongated arcuate guide 128 may be constructed from or coated with a friction reducing material. In use, the elongated arcuate guide 128 is configured to constrain the cable in the groove of the traction sheave 118.

Figure 6:
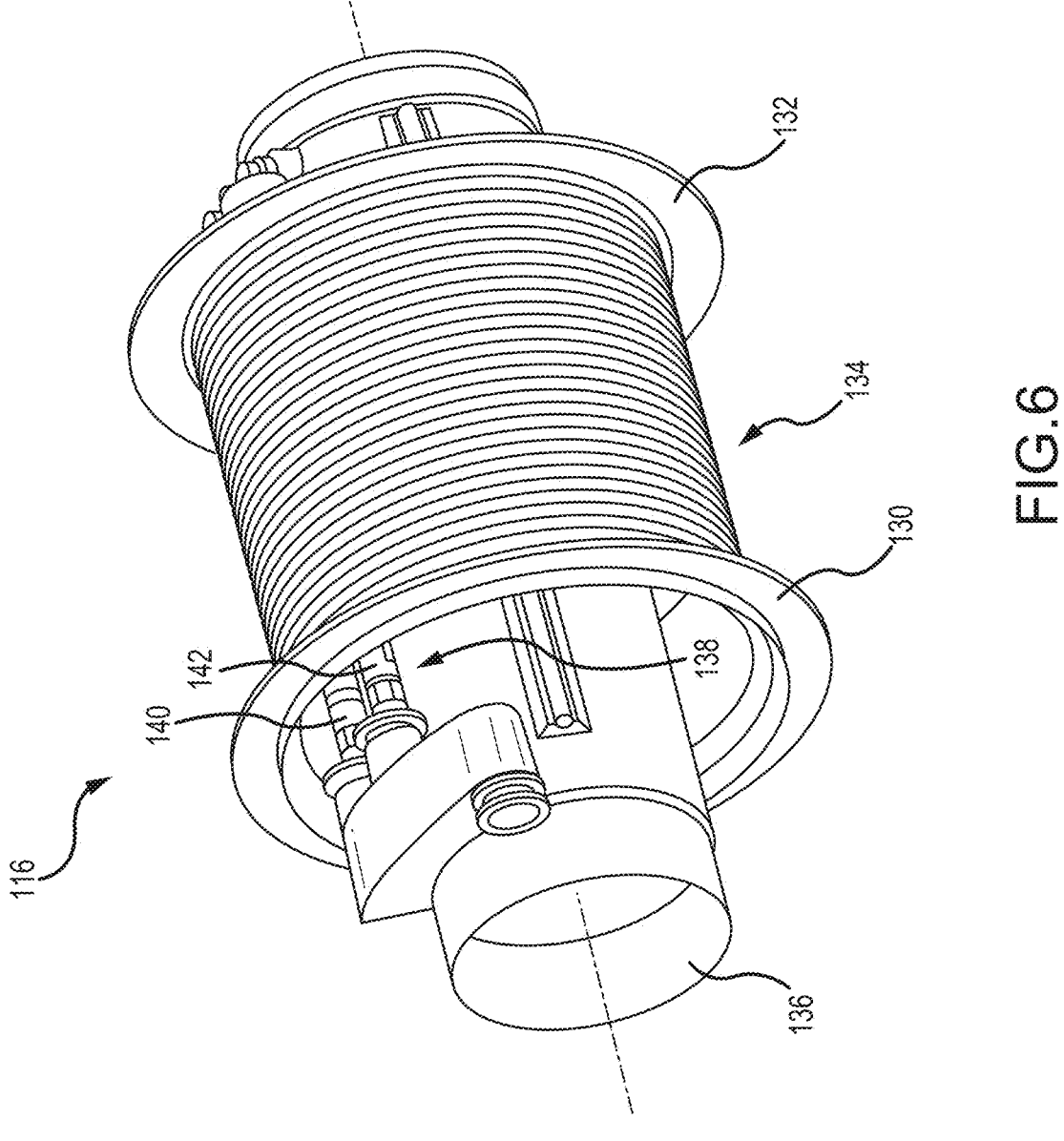
FIG. 6 is an isometric view of a cable drum subassembly, in accordance with example embodiments of this disclosure.

FIG. 6 depicts a configuration of the cable drum 116 suitable for use in the rescue hoist 100. In embodiments, the cable drum 116 may have a first radial flange 130, a second radial flange 132, and a barrel 134 extending axially between the first and second radial flanges 130, 132. In embodiments, the cable drum 116 may be disposed radially outward of a torque tube 136, within which a motor and a drive mechanism may be at least partially housed. In embodiments, both the torque tube 136 and the cable drum 116 may be configured to rotate about a longitudinal axis, and the cable drum 116 configured to translate back and forth along the longitudinal axis. In embodiments, the internal componentry may further include a speed reduction mechanism which may, in various embodiments, include or be coupled to a planetary gear configured to be driven by a ring gear disposed radially outward of the torque tube 136 and driven by a motor and a drive train. The speed reduction mechanism may also be coupled to a level wind mechanism 138. In various embodiments, the level wind mechanism 138 may include a first screw 140 and a second screw 142, both screws extending axially along a radially outer surface of the torque tube 136.

In embodiments, the traction subassembly may include the traction sheave 118 and the at least one pinch roller 120. In embodiments, the traction sheave 118 may include outer circumferential gear teeth and define a circumscribing cable groove in a plane transverse to its rotational axis. The at least one pinch roller 120 may also include outer circumferential gear teeth and define a circumscribing cable groove in a plane transverse to its rotational axis. In embodiments, two of the at least one pinch roller 120 may be rotatably carried by a yoke pivotable about a rotational axis. In use, the cable is constrained between the traction sheave 118 and the at least one pinch roller 120 to back tension the cable to ensure the unloaded cable is wound tight and not fouled. In embodiments, the force of the at least one pinch roller 120 may be modulated to generate a normal force between the cable and the traction sheave 118 to achieve a desired traction performance due to the contact of the cable with the traction sheave 118.

In some embodiments, the traction subassembly may be coupled to the cable drum 116 for synchronous motion. In an alternative embodiment, each of the cable drum 116 and the traction subassembly may be driven by a dedicated motor wherein the motors are communicatively coupled to a controller. In embodiments, the coupling may be achieved with a network of meshed gears. In use, to either deploy or retrieve the cable 114 from rescue hoist 100, the motor is activated to drive the drivetrain. In embodiments, the drivetrain engages with cable drum 116 and causes both the cable drum 116 and the traction subassembly to rotate. As cable drum 116 rotates in a first direction (e.g., counterclockwise), the cable 114 is unspooled and proceeds through the traction sheave 118 and out the exit of the housing 102. The traction sheave 118 is a back-tension device configured to maintain a desired tension on the cable 114 inboard of the traction sheave 118 and onto cable drum 116. In this way, the traction sheave 118 ensures discrete winding of the cable 114 and prevents fouling of the cable 114 within the housing 102.

In embodiments, a follower may be intermeshed with grooves located on a level wind. As the level wind rotates, the follower maintains a connection with grooves on the level wind and tracks along grooves. Due to a fixed connection of the follower, the follower may remain in a fixed position while the level wind rotates causing the level wind to shift axially as the follower blade tracks along grooves. In embodiments, the level wind may be a self-reversing screw, and as such, the follower tracks the level wind in a first direction until the follower reaches an end of level wind, then the follower reverses direction and tracks the level wind in a second direction, opposite the first direction, while the level wind continues to rotate in the first direction. As such, translating may be driven in a reciprocating manner while the level wind rotates in a single direction.

As the cable drum 116 rotates, the cable drum 116 may also move axially to provide level winding of the cable 114 onto the cable drum 116. In embodiments, the level wind may prevent prevents the cable 114 from piling at one end of cable drum 116 because the level wind reverses the direction of travel of cable drum 116 when the cable 114 has reached an end of the cable drum 116. In embodiments, the cable drum 116 may define a helical groove defined by upstanding helical ridging to guide the cable 114 as the cable 114 winds onto the cable drum 116.

From the above description, it is clear that the inventive concepts disclosed herein are well adapted to achieve the objectives and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A rescue hoist, comprising:
   a housing mountable to an airframe;
   a cable drum rotatably mounted in the housing;

a traction sheave rotatably mounted in the housing, the traction sheave positioned to one side of the cable drum;

a cable wrapped around the cable drum in a first angular direction, exiting the cable drum in a first linear direction, entering the traction sheave in the first linear direction, wrapped over the traction sheave in a second angular direction opposite the first angular direction, and exiting the housing under the traction sheave in a second linear direction, the first linear direction and the second linear direction forming an acute angle; and a hook mounted to one end of the cable, the hook positioned outside of the housing and under the traction sheave.

2. The rescue hoist according to claim 1, wherein a rotational axis of the traction sheave is positioned higher in the housing than a rotational axis of the cable drum.

3. The rescue hoist according to claim 1, wherein the first linear direction is an upward direction and wherein the cable is maintained in contact with about half of a circumference of the traction sheave.

4. The rescue hoist according to claim 1, further comprising at least one pinch roller rotatably mounted in the housing and configured to press the cable against the traction sheave.

5. The rescue hoist according to claim 4, wherein each of the traction sheave and the at least one pinch roller defines a circumscribing cable groove in a plane transverse to its rotational axis.

6. The rescue hoist according to claim 1, wherein the cable drum and the traction sheave are coupled for synchronous rotation.

7. The rescue hoist according to claim 1, wherein:

the housing has a top, a bottom, opposing ends, and opposing lateral sides;

the traction sheave is positioned between the cable drum and one of the opposing lateral sides; and a length of the housing is greater than a height of the housing.

8. The rescue hoist according to claim 7, further comprising a medial extension provided on one of the opposing lateral sides of the housing, wherein the traction sheave is disposed, at least partly, in the medial extension, and wherein the cable exits the housing through an opening formed in a bottom of the medial extension.

9. The rescue hoist according to claim 7, further comprising mounting hardware positioned on the top of the housing for mounting the housing to the airframe.

10. The rescue hoist according to claim 1, wherein the housing is configured to mount under a wing of a rotorcraft.

11. A rescue hoist, comprising:

a housing defining a main portion having a first length and a lateral portion having a second length less than the first length, the lateral portion extending from the main portion in a direction perpendicular to the first length;

a cable drum rotatably mounted in the main portion;

a traction sheave rotatably mounted in the lateral portion, wherein a rotational axis of the traction sheave is positioned higher in the housing than a rotational axis of the cable drum;

a cable wrapped around the cable drum, over the traction sheave, and exiting the housing through an opening formed in the bottom of the lateral portion; and a hook mounted to one end of the cable, the hook positioned outside of the housing and under the lateral portion.

12. The rescue hoist according to claim 11, wherein the cable is wrapped around the cable drum in a first direction, and is wrapped over the traction sheave in a second direction opposite the first direction.

13. The rescue hoist according to claim 11, wherein the cable is maintained in contact with about half of a circumference of the traction sheave.

14. The rescue hoist according to claim 11, further comprising at least one pinch roller rotatably mounted in the lateral portion and configured to press the cable against the traction sheave.

15. The rescue hoist according to claim 14, wherein each of the traction sheave and the at least one pinch roller defines a circumscribing cable groove in a plane transverse to its rotational axis.

16. The rescue hoist according to claim 11, wherein the cable drum and the traction sheave are coupled for synchronous rotation.

17. The rescue hoist according to claim 11, wherein:

the main portion has a top, a bottom, opposing ends, and opposing lateral sides; and a length of the main portion is greater than a height of the main portion.

18. The rescue hoist according to claim 17, further comprising mounting hardware positioned on the top of the housing for mounting the housing to an airframe.

19. The rescue hoist according to claim 11, wherein the housing is configured to mount under a wing of a rotorcraft.

* * * * *